(12) United States Patent
Ose (10) Patent No.: US 6,276,227 B1
(45) Date of Patent: Aug. 21, 2001

(54) BICYCLE SHIFT CONTROL DEVICE

(75) Inventor: Kenji Ose, Sakai (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 08/898,457

(22) Filed: Jul. 23, 1997

(51) Int. Cl.[7] .............................. G05G 13/00; G05G 1/08; F16C 1/10; F16H 63/00
(52) U.S. Cl. ............................ 74/489; 74/502.2; 74/506; 474/80; 474/166
(58) Field of Search ................................... 74/489, 502.2, 74/473.14, 473.12, 473.13, 527, 506, FOR 102; 474/160, 166, 80, 82, 79; 124/24 R, 23 R, 86, 90; D8/360; D22/5; 198/370.09, 370.01

(56) References Cited

U.S. PATENT DOCUMENTS

| 3,633,437 | 1/1972 | Ishida ...................................... 74/489 |
| 3,967,609 | * 7/1976 | Frydenlund ......................... 124/24 R |
| 3,987,777 | * 10/1976 | Darlington .......................... 124/86 X |
| 4,541,401 | * 9/1985 | Caldwell ............................. 124/24 R |
| 5,197,927 | 3/1993 | Patterson et al. ....................... 474/80 |
| 5,241,877 | 9/1993 | Chen ....................................... 74/489 |
| 5,307,787 | * 5/1994 | LaBorde et al. ................... 124/90 X |
| 5,339,929 | * 8/1994 | Chern .............................. 74/502.2 X |
| 5,476,019 | * 12/1995 | Chever et la. ...................... 74/489 X |
| 5,481,934 | 1/1996 | Tagawa .................................. 74/475 |
| 5,575,178 | * 11/1996 | Wu ................................... 74/502.2 X |
| 5,701,786 | * 12/1997 | Kawakami ..................... 74/505.2 X |
| 5,971,133 | * 10/1999 | Wilkins ............................ 198/370.09 |

FOREIGN PATENT DOCUMENTS

| 1039864 | 9/1958 | (DE) . |
| 589392 A1 | 3/1994 | (EP) . |
| 636539 A1 | 2/1995 | (EP) . |
| 417963 | 10/1934 | (GB) . |
| 000585473 A1 | * 3/1994 | (JP) ............................... 74/FOR 102 |
| 62677 | 3/1949 | (NL) . |

* cited by examiner

*Primary Examiner*—David A. Bucci
*Assistant Examiner*—Marcus Charles
(74) *Attorney, Agent, or Firm*—James A. Deland (57) ABSTRACT

A clamping apparatus for a shifting control device includes a clamping unit and a housing attached to the clamping unit. The clamping unit includes a clamp member structured to mount to a handlebar around a first axis coaxial with the handlebar, a clamp arm member coupled to the clamp member and extending in a radial direction from the clamping member, and a housing mounting member disposed on the clamp arm member and spaced apart from the clamp member. The housing includes a base member structured to mount to the handlebar around the first axis, a housing arm member coupled to the base member and extending in the direction of the clamp arm member, and a pulley coupling member disposed on the housing arm member and spaced apart from the base member, wherein the pulley coupling member is fixed to the housing mounting member. A pulley is coupled to the pulley coupling member for rotation around a second axis that usually is oriented differently from the first axis. The pulley includes a pulley body having an outer peripheral surface, a first winding groove formed on the outer peripheral surface for winding a first transmission element thereon, and a second winding groove formed on the outer peripheral surface for winding a second transmission clement thereon. The first winding groove is inclined relative to the second winding groove.

62 Claims, 5 Drawing Sheets

BICYCLE SHIFT CONTROL DEVICE

BACKGROUND OF THE INVENTION

The present invention is directed to bicycle shift control devices and, more particularly, to a shift control device having a compact design to facilitate mounting the shift control device in close proximity to other structures.

Twist-grip shift control devices are sometimes used to control various types of bicycle transmissions. Examples of such devices are disclosed in U.S. Pat. No. 3,633,437 and U.S. Pat. No. 5,197,927. Each device disclosed in those patents includes a rotatable handgrip mounted around the handlebar coaxially with the handlebar axis, a pulley inclined relative to the rotatable handgrip for winding a transmission cable, and a motion transmitting structure for transmitting motion of the rotatable handgrip to the pulley. In the device disclosed in U.S. Pat. No. 3,633,437, the motion transmitting member is a pair of bevel gears formed by the peripheral surfaces of the rotatable handgrip and the pulley. The device disclosed in U.S. Pat. No. 5,197,927 also employs a pair of bevel gears formed by the peripheral surfaces of the rotatable handgrip and the pulley. Alternatively, that device may employ a connecting cable connected between the rotatable handgrip and the pulley.

When a connecting cable is used to transmit motion between the rotatable handgrip and the pulley, the pulley typically must have two winding grooves-one for the cable controlling the bicycle transmission and another one for the cable coupling the pulley to the rotatable handgrip. The winding grooves usually are located on an outer peripheral surface of the pulley. The end of each cable is fitted with a terminating nipple that is fitted within a recess formed in the pulley. The pulley ordinarily has a thickness sufficient to accommodate two nipples aligned end to end, even though the two nipples are not always positioned adjacent to each other, in order to provide sufficient support and rigidity for the two cable nipples. However, such a thickness increases the size of the shift control device, thus making the shift control device aesthetically unappealing, and it makes it difficult to mount the shift control device in close proximity to other devices, such as a brake lever assembly.

Another problem with conventional twist-grip shifting devices is that the overall structure of such devices does not allow other control devices to be efficient mounted adjacent to them because the housing of the shifting device usually extends perpendicular to the handlebar, and the pulley is located almost immediately adjacent to the handlebar. As a result, the other control device must be located laterally of the pulley, far away from the rider's hand, which makes the control device difficult if not impossible to operate. Some devices may be mounted adjacent to the housing, but this, too, tends to locate the other control device further from the rider's hand than is desirable.

SUMMARY OF THE INVENTION

The present invention is directed to a bicycle shift control device which has a rotatable handgrip mounted around the handlebar coaxially with the handlebar axis, a pulley inclined relative to the rotatable handgrip for winding a transmission cable, and a motion transmitting structure for transmitting motion of the rotatable handgrip to the pulley. In a twist-grip shifting device constructed according to the present invention the pulley is thinner than conventional pulleys, and the shifting device has a clamping apparatus which clamps the shift control device to the bicycle handlebar in a maimer which allows other control devices to be mounted adjacent to the shifting device very efficiently.

In one embodiment of the present invention directed to the pulley, the pulley includes a pulley body having an outer peripheral surface, a first winding groove formed on the outer peripheral surface for winding a first transmission element, and a second winding groove formed on the outer peripheral surface for winding a second transmission element. The first winding groove is inclined relative to the second winding groove. In a more specific embodiment, the pulley has a mounting portion so that the pulley rotates around a rotational axis, wherein the first winding groove is inclined relative to the second winding groove in the direction of the rotational axis. In an even more specific embodiment, the first winding groove includes a first groove segment that is inclined relative to the second winding groove and a second groove segment that is parallel to the second winding groove. This structure allows any terminating nipple on the first transmission element to be placed closer to the second winding groove, thus decreasing the thickness of the pulley over prior art structures.

In an embodiment of the invention directed to a clamping apparatus which clamps the shift control device to the bicycle handlebar in a manner which allows other control devices to be mounted adjacent to the shifting device very efficiently, the clamping apparatus includes a clamping unit and a housing attached to the clamping unit. In a specific embodiment of the clamping unit, the clamping unit includes a clamp member structured to mount to a handlebar around a first axis coaxial with the handlebar, a clamp arm member coupled to the clamp member and extending in a radial direction from the clamping member, and a housing mounting member disposed on the clamp arm member and spaced apart from the clamp member. The housing includes a base member structured to mount to the handlebar around the first axis, a housing arm member coupled to the base member and extending in the direction of the clamp arm member, and a pulley coupling member disposed on the housing arm member and spaced apart from the base member, wherein the pulley coupling member is fixed to the housing mounting member. A pulley is coupled to the pulley coupling member for rotation around a second axis that usually is oriented differently from the first axis.

In a more specific embodiment of the clamping unit, the housing mounting member is laterally offset from a lateral edge of the clamp arm member, and the housing mounting member defines a housing fastener opening offset from the lateral edge of the arm member for receiving a housing fastener therethrough. The fastener is used to mount the housing to the housing mounting member. The offset positioning of the housing mounting member allows other bicycle control devices to be mounted in the recess formed by the offset housing mounting member and the lateral edge of the clamp arm member. This, in turn, provides for a more ergonomic relationship between the shift control device and the other control device. To make the structure even more ergonomic and compact, the base member of the housing may surround at least a portion of the clamp member, and the housing arm member may extend along the clamp arm member.

DETAILED DESCRIPTION OF THE EMBODIMENTS

Figure 1:
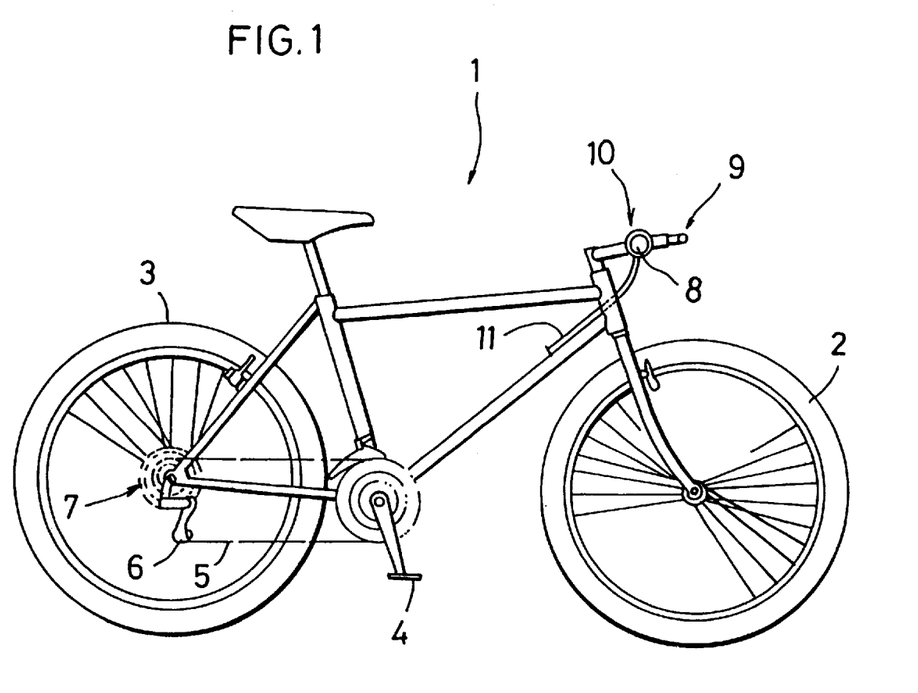
FIG. 1 is a side view of a bicycle equipped with a particular embodiment of a shift control device according to the present invention.

FIG. 1 is a side view of a bicycle 1 equipped with a particular embodiment of a shift control device 10 according to the present invention. Bicycle 1 is a typical bicycle that includes a front wheel 2, a rear wheel 3, pedals 4 for driving a chain 5, and a derailleur 6 that guides chain 5 laterally along a plurality of sprockets 7 mounted to rear wheel 3. Derailleur 6 is controlled by a twist-grip shift control device 10 mounted around a handlebar 8 through a transmission control cable 11. In this embodiment, a brake lever assembly 9 also is mounted around handlebar 8 in close proximity to shift control device 10.

Figure 2:
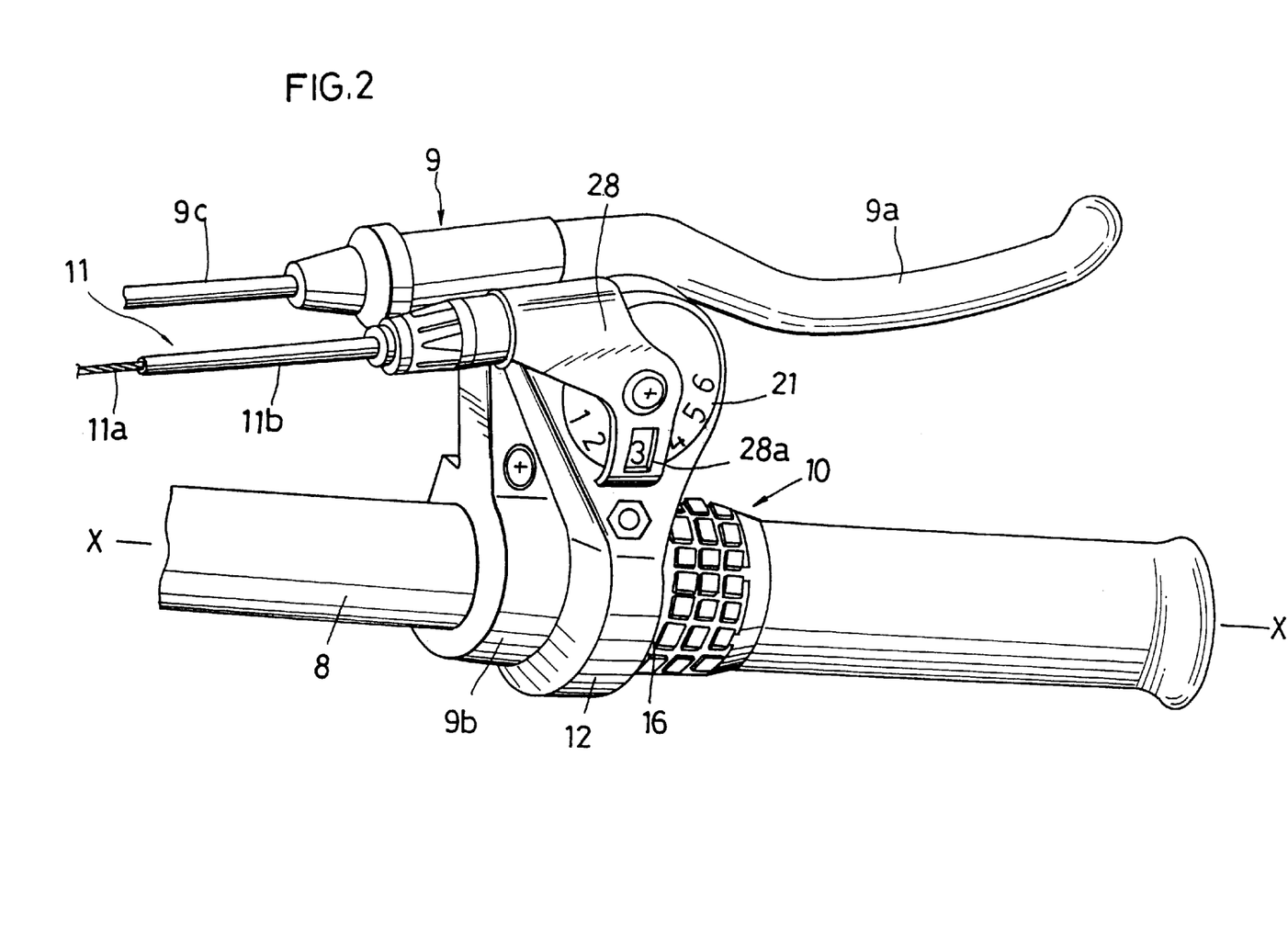
FIG. 2 is an oblique view of the shift control device shown in FIG. 1 mounted together with a brake lever assembly.

FIG. 2 is an oblique view of shift control device 10 mounted together with brake lever assembly 9. As shown in FIG. 2, shift control device 10 includes a housing 12 mounted around the handlebar 8, a rotatable handgrip 16 structured for rotation around an axis X coaxial with handlebar 8, a pulley 21 for pulling and releasing an inner wire 11a of control cable 11, and a pulley retaining member 28 for retaining pulley 21 to housing 12. Pulley retaining member 28 may include a framed opening 28a for selectively displaying a numeral disposed on pulley 21 indicating the currently selected gear.

Brake lever assembly 9 includes a brake lever 9a pivotably mounted to a brake lever bracket 9b which, in turn, is mounted around handlebar 8 in close proximity to (e.g., adjacent) housing 12 of shift control device 10. Brake lever 9a is connected to a brake control cable 9c for controlling a brake device in a conventional manner.

Figure 3:
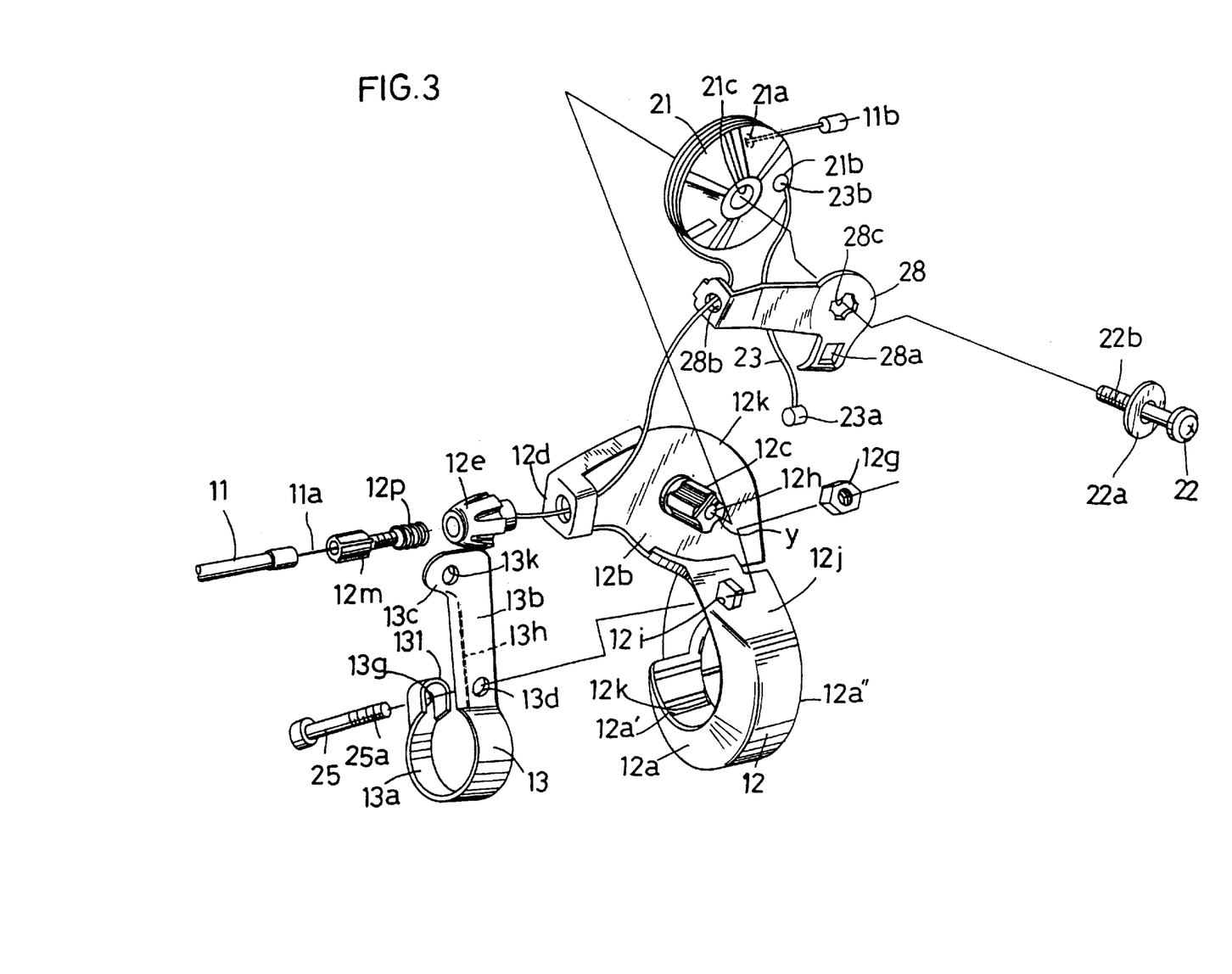
FIG. 3 is an exploded view of a portion of the shift control device shown in FIG. 2 illustrating the clamping unit, the housing for the shift control device, and the pulley used to control the transmission control cable.

FIG. 3 is an exploded view of a portion of shift control device 10 illustrating housing 12, a clamping unit 13 used to fasten shift control device 10 to handlebar 8, pulley 21, and pulley retaining member 28 in more detail. As shown in FIG. 3, clamping unit 13 comprises a collar-shaped clamp member 13a structured to mount around handlebar 8, a clamp arm member 13b coupled to clamp member 13a and extending in a radial direction from clamp member 13a, and a housing mounting member 13c disposed on clamp arm member 13b and spaced apart from clamp member 13a for mounting a portion of housing 12 to clamping unit 13. In this embodiment, housing mounting member 13c is laterally offset from a lateral edge 13h of clamp arm member 13b. This allows brake bracket 9b to be mounted more ergonomically and compactly adjacent to shift control device 10 by fitting brake bracket 9b in the recess formed by the offset housing mounting member 13c and the lateral edge 13h of clamp arm member 13b.

Clamp member 13a includes a fastening flange 13f defining a first fastener opening 13g for receiving a clamping fastener 25 therethrough, and clamp arm member 13b includes a second fastener opening 13d aligned with first fastener opening 13g for receiving clamping fastener 25 therethrough. When housing 12 is assembled to clamping unit 13, clamping fastener 25 also extends through an opening 12f in housing 12, and a threaded portion 25a of clamping fastener 25 engages a threaded nut 12g. Tightening clamping fastener 25 with nut 12g causes fastening flange 13f to move toward clamp arm member 13b, thus tightening clamp member 13a to handlebar 8.

Housing 12 includes a generally annular base member 12a structured to mount around handlebar 8, a housing arm member 12j coupled to base member 12a and extending in the direction of the clamp arm member 13b (e.g., extending along clamp arm member 13b), and a pulley coupling member 12b having a generally flat surface 12k disposed on housing arm member 12j and spaced apart from base member 12a. A pulley shaft 12c having a shaft opening 12h extends from surface 12k, and pulley 21, which has a central opening 21c, is rotatably mounted around pulley shaft 12c for rotation around an axis Y that is oriented differently (e.g., perpendicular) relative to the handlebar axis X.

Pulley retaining member 28 has an opening 28c that is shaped to nonrotatably mount pulley retaining member around pulley shaft 12c. Pulley 21 and pulley retaining member 28 are retained on pulley shaft 12c by a pulley fastener 22 and washer 22a. Pulley fastener 22 extends through shaft opening 12h into a threaded opening 13k defined by housing mounting member 13c so that pulley fastener 22 also fastens pulley coupling member 12b to housing mounting member 13c. Threaded opening 13k is located in the offset portion of housing mounting member 13c so that brake lever bracket 9b may be positioned approximately below opening 13k.

A cable interface member 12e abuts against a cable mounting flange 12d formed on pulley coupling member 12b, and a cable adjusting barrel 12m for receiving outer casing 11b of transmission control cable 11 passes through cable interface member 12e and screws into cable mounting flange 12d. A resistance enhancing spring 12p is disposed between cable adjusting barrel 12m and cable interface member 12e to press cable interface member 12e against cable mounting flange 12d and prevent inadvertent movement of cable adjusting barrel 12m. Cable adjusting barrel 12m operates in a well known manner to adjust the tension on inner cable 11a.

Figures 4A, 4B, 4C, 4F:
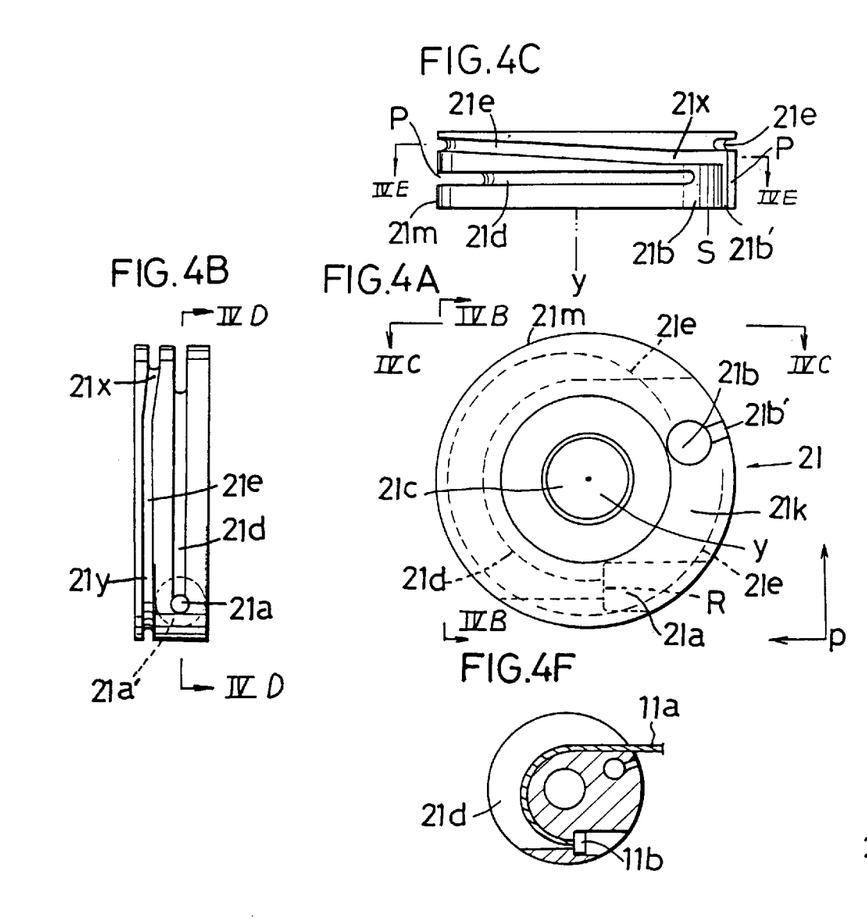
FIG. 4A is a plan view of a particular embodiment of the pulley shown in FIG. 3.
FIG. 4B is a view taken along line IVB—IVB in FIG. 4A.
FIG. 4C is a view taken along line IVC—IVC in FIG. 4A.
FIG. 4F is a view similar to FIG. 4D showing an alternative embodiment of a cable winding surface used in the pulley according to the present invention.
Figure 4D:
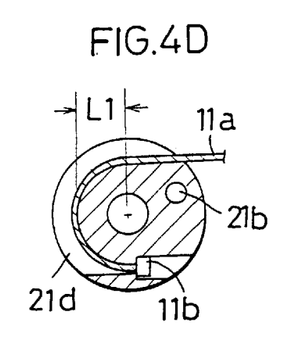
FIG. 4D is a view taken along line IVD—IVD in FIG. 4B.
Figure 4E:
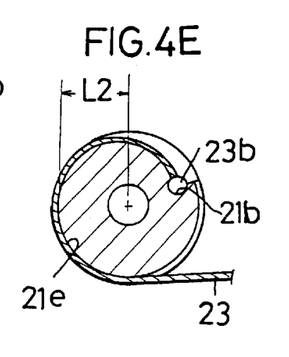
FIG. 4E is a view taken along line IVE—IVE in FIG. 4C.

FIGS. 4A–4E illustrate the structure of pulley 21 in more detail. Pulley 21 includes a pulley body 21k having an outer peripheral surface 21m and a central opening 21c for receiving pulley shaft 12c therethrough. A first winding groove 21e is formed on the outer peripheral surface 21m for winding a first transmission element in the form of a connecting cable 23 (FIG. 3), and a second winding groove 21d is formed on the outer peripheral surface 21m for winding a second transmission element in the form of inner wire 11a of transmission control cable 11. As seen more specifically in FIG. 4C, first winding groove 21e is inclined relative to second winding groove 21d in the direction of the rotational axis Y. More specifically, first winding groove 21e includes a first groove segment 21x that is inclined relative to second winding groove 21d and a second groove segment 21y that is parallel to the second winding groove 21d. In this embodiment, first winding groove 21e has 10a varying radius of curvature L2 as shown in FIG. 4E, whereas second winding groove 21d has a constant radius of curvature L1 as shown in FIG. 4D. Alternatively, second winding groove 21d may have a varying radius of curvature as shown in FIG.

4F. Of course, first winding groove 21e may have a constant radius of curvature if desired in some applications. Second winding groove 21d lies completely within a rotation plane P perpendicular to axis Y (in which case first winding groove 21e is inclined relative to rotation plane P), but of course that is not necessary.

Pulley 21 further includes a first transmission element fixing portion in the form of a generally cylindrical opening 21b for seating a terminating nipple 23b attached to the end of cable 23, and a second transmission element fixing portion in the form of a generally cylindrical opening 21a for seating a terminating nipple 11b attached to the end of inner wire 11a. In this embodiment, cylindrical openings 21a and 21b are located in close proximity to outer peripheral surface 21m, and they are spaced apart from each other in the peripheral direction of the pulley body 21k. A cable passage 21b' extends from opening 21b through a side of pulley body 21k to facilitate placement of termination nipple 23b in opening 21b. Opening 21a has a longitudinal opening axis R that is generally tangent to groove 21d, and opening 21b has a longitudinal axis S that extends generally parallel to rotational axis Y. These structures combine to provide a pulley that is thinner than prior art pulleys.

Figure 5:
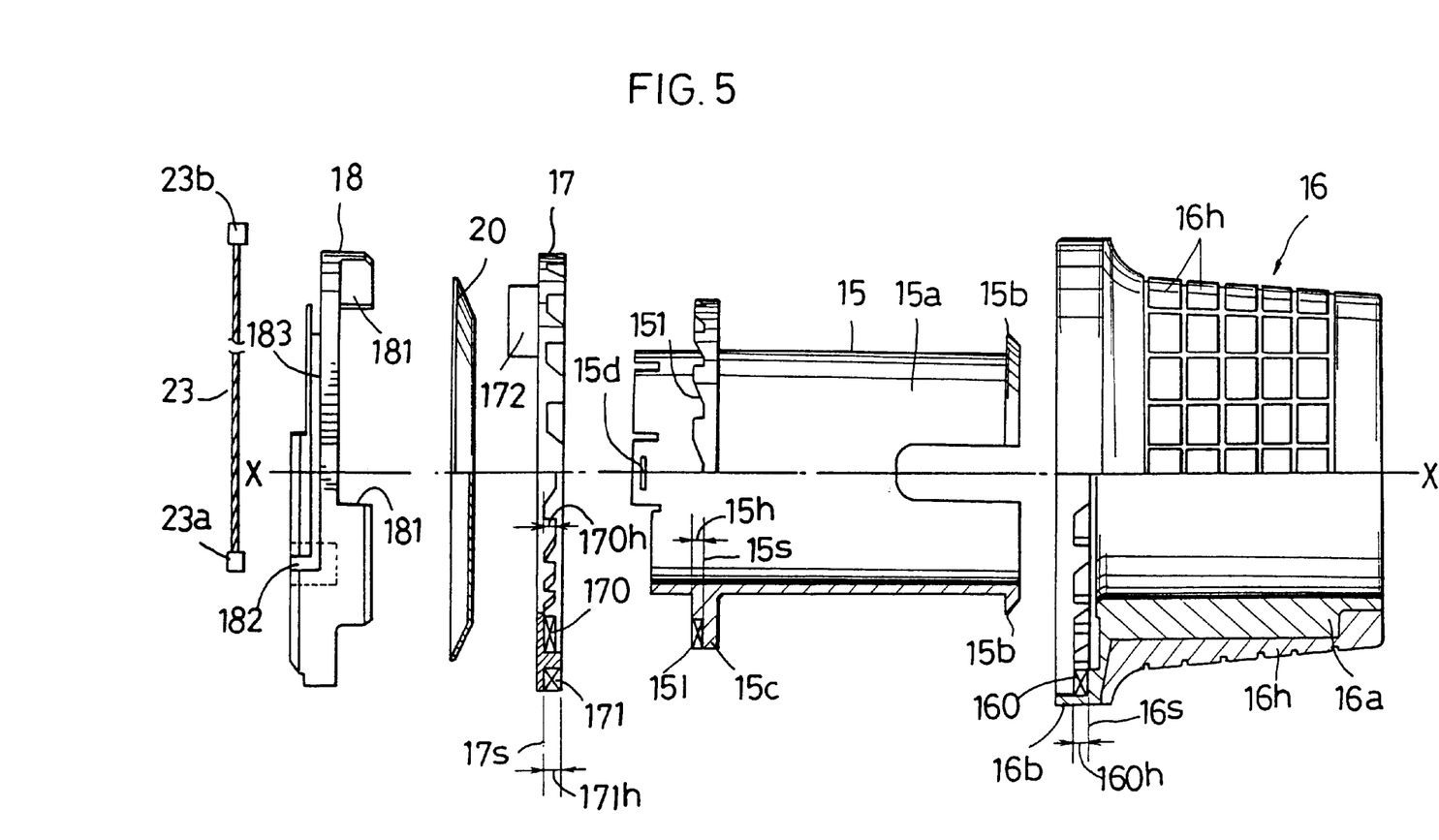
FIG. 5 is an exploded view of a particular embodiment of the indexing mechanism used in the shift control device shown in FIG. 3.

FIG. 5 is an exploded view of a particular embodiment of the indexing mechanism used in shift control device 10. As shown in FIG. 5, shift control device 10 further includes a fixed member 15 for attaching to handlebar 8 in such a way that it cannot rotate in relation to handlebar 8; rotatable handgrip 16, with gripping protrusions 16h' capable of rotating around the handlebar axis X on fixed member 15; an intermediate element 17 (called "an idler") that meshes with both the fixed member 15 and the rotatable handgrip 16, that can rotate around the handlebar axis X, and that can move along the handlebar axis X; and a takeup member 18 that remains in constant gear engagement with the intermediate element 17, and can thus rotate integrally with intermediate element 17. The general theory of operation (and numbering) of these components is the same as the indexing mechanism described in U.S. patent application Ser. No. 08/854,520 filed May 12, 1997 entitled "Bicycle Shift Control Device" by Takuro Yamane and incorporated herein by reference. This embodiment of an indexing mechanism differs from the embodiment shown in that patent application in that a terminating nipple 23a attached to the opposite end of connecting cable 23 is fitted within a generally cylindrical opening 182 in takeup member 18 so that connecting cable 23 winds around a winding groove 183, there are fewer serrations 172 and teeth 181, and there is a coupling hole 15d in fixed member 15 for coupling to a coupling abutment 12k in base member 12. Otherwise the components are structured and operate the same, so a further description of these components is omitted.

While the above is a description of various embodiments of the present invention, further modifications may be employed without departing from the spirit and scope of the present invention. Thus, the scope of the invention should not be limited by the specific structures disclosed. Instead, the true scope of the invention should be determined by the following claims.

What is claimed is:

1. A pulley comprising:
   a pulley body having an outer peripheral surface and a rotational axis, wherein the rotational axis is centered when the pulley body is viewed in the direction of the rotational axis;
   a first winding groove formed on the outer peripheral surface for winding a first transmission element thereon;
   a second winding groove formed on the outer peripheral surface for winding a second transmission element thereon;
   wherein the first winding groove is inclined relative to the second winding groove;
   a first opening for seating a terminating nipple attached to the first transmission element, wherein the first opening has a generally cylindrical shape defining a concentric longitudinal first axis that extends in a direction of the rotational axis; and
   a second opening for seating a terminating nipple attached to the second transmission element, wherein the second opening has a generally cylindrical shape defining a concentric longitudinal second axis that is generally tangent to the second groove and extends radially away from the rotational axis.

2. The pulley according to claim 1 wherein the pulley has a mounting portion so that the pulley rotates around a rotational axis, and wherein the first winding groove is inclined relative to the second winding groove in the direction of the rotational axis.

3. The pulley according to claim 1 wherein the second winding groove has a constant radius of curvature.

4. The pulley according to claim 1 wherein the second winding groove has a varying radius of curvature.

5. The pulley according to claim 1 wherein the first opening is located in close proximity to the outer peripheral surface, and wherein the second opening is located in close proximity to the outer peripheral surface.

6. The pulley according to claim 1 wherein the longitudinal second opening axis is oriented generally perpendicular to the rotational axis.

7. The pulley according to claim 2 wherein the first winding groove includes:
   a first groove segment that is inclined relative to the second winding groove; and
   a second groove segment that is parallel to the second winding groove.

8. The pulley according to claim 2 wherein the second winding groove is oriented perpendicular to the rotational axis.

9. The pulley according to claim 5 wherein the first opening is spaced apart from the second opening in the peripheral direction of the pulley body.

10. The pulley according to claim 8 wherein the entire second winding groove is oriented perpendicular to the rotational axis.

11. A bicycle shift control device comprising:
   a rotatable handgrip structured for rotation around a first axis coaxial with a handlebar;
   a pulley operatively coupled to the handgrip for rotation in a rotation plane around a rotational axis in response to rotation of the handgrip, wherein the rotational axis is centered when the pulley is viewed in the direction of the rotational axis, and wherein the pulley includes:
      an outer peripheral surface; and
      a first winding groove formed on the outer peripheral surface and inclined relative to the rotation plane.

12. The device according to claim 11 wherein the first winding groove has a constant radius of curvature.

13. The device according to claim 11 wherein the first winding groove has a varying radius of curvature.

14. The device according to claim 11 wherein the first axis is oriented differently from the rotational axis.

15. The device according to claim 11 further comprising a flexible transmission element coupled between the pulley and the handgrip for transmitting rotation of the handgrip to the pulley, wherein the transmission element winds around the first winding groove.

16. The device according to claim 15 further comprising a winding member operatively coupled to the handgrip for rotation around the first axis in response to rotation of the handgrip, wherein the winding member includes a winding member winding groove, and wherein the transmission element is coupled to the winding member and winds around the winding member winding groove.

17. The device according to claim 15 wherein the pulley includes a second winding groove formed on the outer peripheral surface, and wherein the first winding groove is inclined relative to the second winding groove.

18. The device according to claim 15 wherein the pulley includes:
 a first transmission element fixing portion for fixing an end of a first transmission element; and
 a second transmission element fixing portion for fixing an end of a second transmission element, wherein the second transmission element fixing portion is located in close proximity to the outer peripheral surface.

19. The device according to claim 17 wherein the first winding groove includes:
 a first groove segment that is inclined relative to the second winding groove; and
 a second groove segment that is parallel to the second winding groove.

20. The device according to claim 17 wherein the second winding groove lies in the rotation plane.

21. The device according to claim 18 wherein the first transmission element fixing portion is located in close proximity to the outer peripheral surface, and wherein the second transmission element fixing portion is located in close proximity to the outer peripheral surface.

22. The device according to claim 20 wherein the entire second winding groove lies in the rotation plane.

23. The device according to claims 21 wherein the first transmission element fixing portion is spaced apart from the second transmission element fixing portion in the peripheral direction of the pulley body.

24. The device according to claim 23 wherein the pulley body defines a generally cylindrical first opening for forming the first transmission element fixing portion, wherein the first opening has a longitudinal first opening axis that extends in the direction of the rotational axis.

25. The device according to claim 24 wherein the pulley body defines a generally cylindrical second opening for forming the second transmission element fixing portion, wherein the second opening has a longitudinal second opening axis that is generally tangent to the second groove.

26. A bicycle shift control device comprising:
 a rotatable handgrip structured for rotation around a first axis coaxial with a handlebar;
 a pulley operatively coupled to the handgrip for rotation around a second axis in response to rotation of the handgrip, wherein the second axis is centered when the pulley is viewed in the direction of the second axis, and wherein the pulley includes:
 an outer peripheral surface;
 a first winding groove formed on the outer peripheral surface for winding a first transmission element thereon;
 a second winding groove formed on the outer peripheral surface for winding a second transmission element thereon; and
 wherein the first winding groove is inclined relative to the second winding groove.

27. The device according to claim 26 wherein the second winding groove has a constant radius of curvature.

28. The device according to claim 26 wherein the second winding groove has a varying radius of curvature.

29. The device according to claim 26 wherein the first winding groove is inclined relative to the second winding groove in the direction of the second axis.

30. The device according to claim 26 wherein the pulley includes:
 a first transmission element fixing portion for fixing an end of a first transmission element; and
 a second transmission element fixing portion for fixing an end of a second transmission element.

31. The device according to claim 29 wherein the first winding groove includes:
 a first groove segment that is inclined relative to the second winding groove; and
 a second groove segment that is parallel to the second winding groove.

32. The device according to claim 29 wherein the second winding groove is oriented perpendicular to the second axis.

33. The device according to claim 30 wherein the first transmission element fixing portion is located in close proximity to the outer peripheral surface, and wherein the second transmission element fixing portion is located in close proximity to the outer peripheral surface.

34. The device according to claim 32 wherein the entire second winding groove is oriented perpendicular to the second axis.

35. The device according to claim 33 wherein the first transmission element fixing portion is spaced apart from the second transmission element fixing portion in the peripheral direction of the pulley body.

36. The device according to claim 35 wherein the pulley body defines a generally cylindrical first opening for forming the first transmission element fixing portion, wherein the first opening has a longitudinal first opening axis that extends in the direction of the second axis.

37. The device according to claim 36 wherein the pulley body defines a generally cylindrical second opening for forming the second transmission element fixing portion, wherein the second opening has a longitudinal second opening axis that is generally tangent to the second groove.

38. A clamping apparatus for a shift control device for a bicycle comprising:
 a clamping unit comprising:
 a clamp member structured to mount to a handlebar around a first axis coaxial with the handlebar;
 a clamp arm member coupled to the clamp member and extending in a radial direction from the clamp member;
 wherein the clamp arm member includes a housing mounting member spaced apart from the clamp member and projecting laterally from a lateral edge of the clamp arm member for forming a lateral protrusion for mounting a housing to the clamping unit; and
 wherein the housing mounting member includes a first opening for receiving a first fastener therethrough;
 a housing mounted to the housing mounting member, wherein the housing comprises a base member structured to mount around the first axis; and
 wherein the base member surrounds at least a portion of the clamp member.

39. The apparatus according to claim 38 wherein the housing mounting member defines an opening laterally offset from the lateral edge of the clamp arm member.

40. The apparatus according to claim 38 wherein the clamp member includes a fastening flange defining a first fastener opening for receiving a clamping fastener therethrough, and wherein the clamp arm member includes a second fastener opening aligned with the first fastener opening for receiving the clamping fastener therethrough.

41. The apparatus according to claim 38 wherein the clamp arm member includes a second opening in close proximity to the clamp member for receiving a second fastener therethrough.

42. The apparatus according to claim 40 wherein the housing mounting member defines a housing fastener opening offset from the lateral edge of the arm member for receiving a housing fastener therethrough.

43. A clamping apparatus for a shift control device for a bicycle comprising:
a clamping unit comprising:
a clamp member structured to mount to a handlebar around a first axis coaxial with the handlebar;
a clamp arm member coupled to the clamp member and extending in a radial direction from the clamp member;
wherein the clamp arm member includes a housing mounting member spaced apart from the clamp member and projecting laterally from a lateral edge of the clamp arm member for forming a lateral protrusion for mounting a housing to the clamping unit; and
wherein the housing mounting member includes a first opening for receiving a first fastener therethrough;
a housing separate from the clamping unit and mounted to the housing mounting member, wherein the housing comprises a base member structured to mount around the first axis; and
wherein the housing further comprises a housing arm member one-piece with the base member and extending in a direction of the clamp arm member.

44. The apparatus according to claim 43 wherein the housing arm member extends along the clamp arm member.

45. The apparatus according to claim 43 wherein the housing further comprises a pulley coupling member disposed on the housing arm member and spaced apart from the base member, wherein the pulley coupling member is attached to the housing mounting member.

46. A clamping apparatus for a shift control device for a bicycle comprising:
a clamping unit comprising:
a clamp member structured to mount to a handlebar around a first axis coaxial with the handlebar;
a clamp arm member coupled to the clamp member and extending in a radial direction from the clamp member; and
a housing mounting member disposed on the clamp arm member, spaced apart from the clamp member and laterally offset from a lateral edge of the clamp arm member;
a housing mounted to the housing mounting member, wherein the housing includes:
a base member structured to mount around the first axis;
a housing arm member coupled to the base member and extending in a direction of the clamp arm member; and
a pulley coupling member disposed on the housing arm member and spaced apart from the base member, wherein the pulley coupling member is attached to the housing mounting member; and
a pulley coupled to the pulley coupling member for rotation around a second axis.

47. The apparatus according to claim 46 wherein the second axis is oriented differently from the first axis.

48. The apparatus according to claim 47 wherein the second axis is oriented perpendicular to the first axis.

49. A clamping apparatus for a shift control device for a bicycle comprising:
a clamping unit comprising:
a clamp member structured to mount to a handlebar around a first axis coaxial with the handlebar;
a clamp arm member coupled to the clamp member and extending in a radial direction from the clamp member; and
a housing mounting member disposed on the clamp arm member and spaced apart from the clamp member;
a housing mounted to the housing mounting member, wherein the housing comprises:
a base member structured to mount to the handlebar around the first axis;
a housing arm member coupled to the base member and extending in the direction of the clamp arm member; and
a pulley coupling member disposed on the housing arm member and spaced apart from the base member, wherein the pulley coupling member is fixed to the housing mounting member; and
a fastener extending through the housing arm member and through the clamp arm member.

50. The apparatus according to claim 49 wherein the base member surrounds at least a portion of the clamp member.

51. The apparatus according to claim 49 wherein the housing arm member extends along the clamp arm member.

52. The apparatus according to claim 49 wherein the housing mounting member defines an opening laterally offset from a lateral edge of the clamp arm member in the direction of the first axis for receiving the fastener therethrough.

53. A clamping apparatus for a shift control device for a bicycle comprising:
a clamping unit comprising:
a clamp member structured to mount to a handlebar around a first axis coaxial with the handlebar;
a clamp arm member coupled to the clamp member and extending in a radial direction from the clamp member; and
a housing mounting member disposed on the clamp arm member and spaced apart from the clamp member;
a housing mounted to the housing mounting member, wherein the housing comprises:
a base member structured to mount to the handlebar around the first axis;
a housing arm member coupled to the base member and extending in the direction of the clamp arm member; and
a pulley coupling member disposed on the housing arm member and spaced apart from the base member, wherein the pulley coupling member is fixed to the housing mounting member; and
a pulley coupled to the pulley coupling member for rotation around a second axis.

54. The apparatus according to claim 53 wherein the second axis is oriented differently from the first axis.

55. The apparatus according to claim 54 wherein the second axis is oriented perpendicular to the first axis.

56. A clamping apparatus for a shift control device for a bicycle comprising:
- a clamping unit comprising:
  - a clamp member structured to mount to a handlebar around a first axis coaxial with the handlebar;
  - a clamp arm member one-piece with the clamp member and extending in a radial direction from the clamp the clamp member; and
  - a housing mounting member one-piece with the clamp arm member, spaced apart from the clamp member and projecting laterally from a lateral edge of the clamp arm member for forming a lateral protrusion for mounting a housing to the clamping unit;
- a housing mounted to the housing mounting member, wherein the housing comprises a base member structured to mount around the first axis; and
- wherein the base member surrounds at least a portion of the clamp member.

57. The apparatus according to claim 56 wherein the housing mounting member defines an opening laterally offset from the lateral edge of the clamp arm member.

58. The apparatus according to claim 56 wherein the clamp member includes a fastening flange defining a first fastener opening for receiving a clamping fastener therethrough, and wherein the clamp arm member includes a second fastener opening aligned with the first fastener opening for receiving the clamping fastener therethrough.

59. The apparatus according to claim 58 wherein the housing mounting member defines a housing fastener opening offset from the lateral edge of the arm member for receiving a housing fastener therethrough.

60. A clamping apparatus for a shift control device for a bicycle comprising:
- a clamping unit comprising:
  - a clamp member structured to mount to a handlebar around a first axis coaxial with the handlebar;
  - a clamp arm member one-piece with the clamp member and extending in a radial direction from the clamp member; and
  - a housing mounting member one-piece with the clamp arm member, spaced apart from the clamp member and projecting laterally from a lateral edge of the clamp arm member for forming a lateral protrusion for mounting a housing to the clamping unit;
- a housing separate from the clamping unit and mounted to the housing mounting member, wherein the housing comprises a base member structured to mount around the first axis; and
- wherein the housing further comprises a housing arm member one-piece with the base member and extending in a direction of the clamp arm member.

61. The apparatus according to claim 60 wherein the housing arm member extends along the clamp arm member.

62. The apparatus according to claim 60 wherein the housing further comprises a pulley coupling member disposed on the housing arm member and spaced apart from the base member, wherein the pulley coupling member is attached to the housing mounting member.

* * * * *